(12) United States Patent
Hooda et al.

(10) Patent No.: US 10,462,007 B2
(45) Date of Patent: Oct. 29, 2019

(54) NETWORK ADDRESS TRANSPARENCY THROUGH USER ROLE AUTHENTICATION

(71) Applicant: Cisco Technology, Inc., San Jose, CA (US)

(72) Inventors: Sanjay Kumar Hooda, Pleasanton, CA (US); Darrin Joseph Miller, Marysville, OH (US); Victor Moreno, Carlsbad, CA (US); Mark Montanez, Gilroy, CA (US); Sridhar Subramanian, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 255 days.

(21) Appl. No.: 15/193,482

(22) Filed: Jun. 27, 2016

(65) Prior Publication Data
US 2017/0373936 A1 Dec. 28, 2017

(51) Int. Cl.
*H04L 29/06* (2006.01)
*G06F 17/30* (2006.01)
*G06F 15/16* (2006.01)
*G06F 7/04* (2006.01)
*H04L 12/24* (2006.01)
*H04L 29/08* (2006.01)
*H04L 12/715* (2013.01)

(52) U.S. Cl.
CPC .......... *H04L 41/0816* (2013.01); *H04L 63/08* (2013.01); *H04L 63/0876* (2013.01); *H04L 63/104* (2013.01); *H04L 67/306* (2013.01); *H04L 41/12* (2013.01); *H04L 45/64* (2013.01)

(58) Field of Classification Search
CPC ............................ H04L 41/0816; H04L 41/12
USPC ............................................................. 726/4
See application file for complete search history.

(56) References Cited

U.S. PATENT DOCUMENTS

| | | | |
|---|---|---|---|
| 6,990,592 B2 * | 1/2006 | Richmond | .......... H04L 63/0218 709/226 |
| 7,562,224 B2 | 7/2009 | Krischer et al. | |

(Continued)

OTHER PUBLICATIONS

Dijiang Huang; MobiCloud: Building Secure Cloud Framework for Mobile Computing and Communication; IEEE:2010; p. 27-34.*

(Continued)

*Primary Examiner* — Monjur Rahim
(74) *Attorney, Agent, or Firm* — Edell, Shapiro & Finnan, LLC

(57) ABSTRACT

Changes are made to a virtual network for an endpoint based on the authenticated user identity of the endpoint. The system includes a server and a controller associated with a network fabric to which the endpoint is connected. The network fabric includes network elements to carry network traffic for the endpoint. The server authenticates the endpoint associated with a network address and determines a user identity of the endpoint based on the authentication. The server determines a first virtual network associated with the user identity. The controller receives a notification from the server that the network traffic for the endpoint associated with the network address is to be routed over the first virtual network. The controller updates routing information to associate the network address with the first virtual network and sends the updated routing information to the network elements of the network fabric.

20 Claims, 7 Drawing Sheets

(56) References Cited

U.S. PATENT DOCUMENTS

| | | | | |
|---|---|---|---|---|
| 7,805,606 | B2* | 9/2010 | Birger | H04L 29/12207 |
| | | | | 713/168 |
| 8,627,447 | B1* | 1/2014 | Chickering | H04L 63/0263 |
| | | | | 726/11 |
| 2008/0189769 | A1* | 8/2008 | Casado | G06F 21/6281 |
| | | | | 726/4 |
| 2010/0085940 | A1* | 4/2010 | Murphy | H04L 61/2015 |
| | | | | 370/331 |
| 2011/0231917 | A1* | 9/2011 | Chaturvedi | H04L 29/08846 |
| | | | | 726/8 |
| 2013/0205040 | A1* | 8/2013 | Naor | H04L 61/256 |
| | | | | 709/238 |
| 2014/0282889 | A1* | 9/2014 | Ishaya | H04L 63/08 |
| | | | | 726/4 |
| 2014/0304765 | A1* | 10/2014 | Nakamoto | H04L 63/20 |
| | | | | 726/1 |
| 2016/0080318 | A1* | 3/2016 | Sood | H04L 67/42 |
| | | | | 709/203 |
| 2016/0142474 | A1* | 5/2016 | Itsumi | H04L 67/10 |
| | | | | 370/390 |
| 2016/0352731 | A1* | 12/2016 | Mentze | H04L 12/6418 |
| 2017/0005928 | A1* | 1/2017 | Theogaraj | H04L 45/742 |

OTHER PUBLICATIONS

"Cisco Easy Virtual Network", At-A-Glance, C45-675118-00, Jun. 2011, 2 pages.

* cited by examiner

NETWORK ADDRESS TRANSPARENCY THROUGH USER ROLE AUTHENTICATION

TECHNICAL FIELD

The present disclosure relates to authentication and control of computer network resources.

BACKGROUND

Network resource access control is a function typically realized through a combination of functionality from endpoints (users or devices), network switches, and/or authentication servers. A network typically connects endpoints with resources (resident either locally in a server or remotely in a cloud server). Four functions—Identity, Authentication, Authorization, and Access control (e.g., policy enforcement)—may be facilitated and performed in the network. In some network models, third party solutions for Authentication (e.g., single sign-on) and Authorization may be combined with separate devices for Identity and Access Control. Alternatively, another common solution is to leave wired network ports unauthenticated.

Many customer environments are subject to scenarios in which administrators do not have control of end user device software inventory, and they also cannot manage client supplicant installations. Some authentication mechanisms include port-based methods (which involve configurations that are not easily automated), web-based, and Media Access Control (MAC) bypass. This variety of authentication mechanisms may leave customers unable to strike the right balance between security and automation.

DESCRIPTION OF EXAMPLE EMBODIMENTS

Overview

Figure 1:
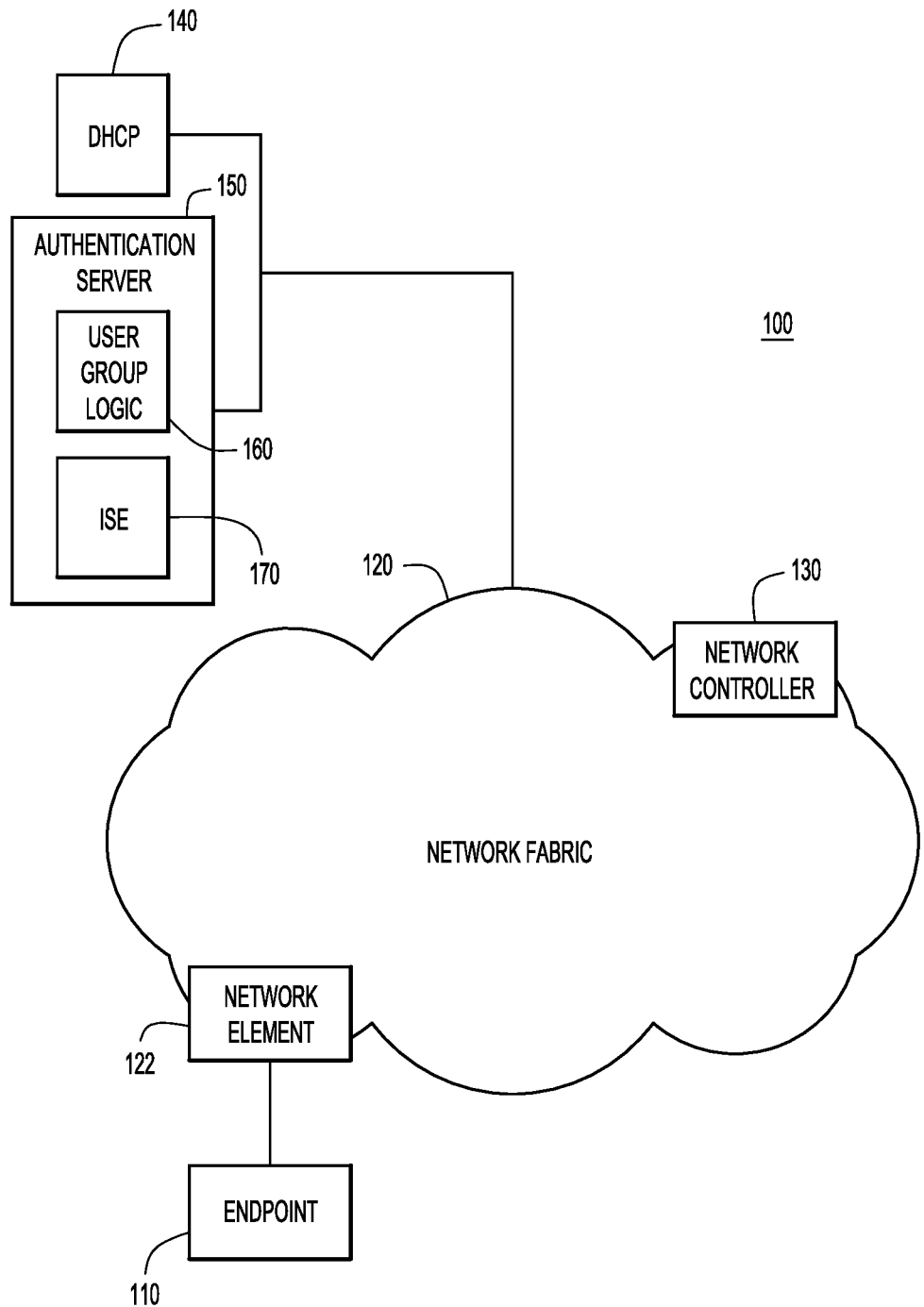
FIG. 1 is a system block diagram illustrating a local network fabric that provisions and authenticates endpoints through a remote service, according to an example embodiment.

In one embodiment, a system is provided to change the virtual network for an endpoint based on the authenticated user identity of the endpoint. The system comprises a server and a controller associated with a network fabric to which the endpoint is connected. The network fabric includes a plurality of network elements configured to carry network traffic for the endpoint. The server is configured to authenticate the endpoint associated with a network address and determines a user identity of the endpoint based on the authentication. The server is also configured to determine a first virtual network associated with the user identity. The controller is configured to receive a notification from the server that the network traffic for the endpoint associated with the network address is to be routed over the first virtual network. The controller is also configured to update routing information to associate the network address with the first virtual network and send the updated routing information to the plurality of network elements.

Detailed Description

In one example embodiment, the techniques presented herein use a virtual networking construct in a network fabric that, once a user endpoint is authenticated (e.g., webauth, Lightweight Directory Access Protocol (LDAP), etc.), places network traffic for the endpoint in a new Virtual Local Area network (VLAN). The endpoint keeps the same Internet Protocol (IP) address on the same subnet, but a different virtual network. This allows IP transparency and a flexible security policy across the endpoint devices and the network fabric.

A network fabric typically consists of an underlay and an overlay. The underlay deals with connectivity between fabric elements and the overlay deals with user traffic entering the network. Network traffic enters the fabric through fabric edge nodes, which are responsible for encapsulating the network traffic packets with a fabric header that contains the egress fabric edge node address. When the packet arrives at the egress fabric edge node, the fabric header is stripped off and the native packet is forwarded according to the inner network address. Network fabrics typically provide Layer-2 and Layer-3 services on top of the underlay.

In manufacturing environments (e.g., discrete as well as process control), the first line support worker for Process Logic Controllers (PLCs), Human Machine Interfaces (HMIs), sensors (e.g., drive sensors, etc.), is typically an electrician or maintenance worker who may not be trained in Information Technology (IT). Typically, for the first line worker to perform maintenance on a PLC Input/Output (I/O) module or sensor, they will replace the current module with a new module off of a shelf of spare parts. When moving to a policy-driven network, a problem arises in identifying the new device when it has no supplicant and there is no workflow to register the I/O module/sensor into a policy system.

In a typical installation, either the manufacturing system (e.g., Factory Talk) or an Identity Services Engine (ISE) is used to enable session management on the edge switch (e.g., IEEE 802.1A, MAC Authentication Bypass (MAB), Device Sensor, etc.) and perform a MAC match based on an Organizationally Unique Identifier (OUI) and profiled data (e.g., network data from Dynamic Host Configuration Protocol (DHCP) or application data such as Rockwell Common Industrial Protocol (CIP)). This solution requires that the device be allowed onto the network into a VLAN/subnet before network or application data can be gathered to form a profile for the device. This may work in customer environments that already have the switch ports provisioned for the correct VLAN/subnet in the network. The session management at the switch allows authorization to apply discretionary access control lists (DACLs), Uniform Resource Locator (URL) redirection, Source Group Tags (SGTs) on the device, but does not allow a dynamic VLAN assignment.

Since there is no signaling to the device to indicate that is should renew an IP address (e.g., no Network Announcement and Selection Protocol (NASP), 802.1X, etc.), the newly admitted device is not directed to obtain an appropriate IP address for its identity profile. In some environments, a Change of Authorization (COA) may allow a policy server to issue ports admin up and admin down commands (e.g., shut/no shut). This may force some embedded devices in the IT environment to renew their assigned IP address, but not always. For instance, many Internet of Things (IoT) devices do not relinquish their DHCP-derived IP address based on port down events. These devices hold their initial IP address until power cycled or even until they are fully disconnected from power.

SGTs may be appealing to IoT customers since they introduce a policy-driven access control policy without dynamic VLAN change and IP address reassignment. However, SGTs may cause issues with forwarding, such as Layer-2 extension across a Layer-3 underlay fabric, as well as limiting Layer-2 broadcast and multicast domains for particular IoT protocols and applications. The techniques presented herein provide for a fabric that can provide policy-driven access control while also providing IP forwarding transparency for VLANs (e.g., Locator/Identifier Separation Protocol (LISP)) that allows the fabric to use dynamic VLAN assignment to put IoT devices into the proper VLAN for Layer-2 extension across a fabric and limits on a Layer-2 broadcast/multicast domains (e.g., VLANs).

In another example embodiment, a networking solution is provided that is intelligent to selectively perform authorization and enforce network access control, yet is flexible to interface with third part authentication or authorization systems. In this example, users are able to access resources (e.g., servers connected to the network) from anywhere. The network is secured from endpoints (users or devices). An effective provisioning and automation experience is realized such that an endpoint's identity is subject to authentication without any constraints of network port level or endpoint device level configurational overhead. Additionally, deployment flexibility is allowed such that third party resources may be used for authentication/authorization functionality with another party providing network devices for a combination of authorization and network access control. In contrast to port-based authentication methods, the solution presented herein allows for trusting an endpoint identity (i.e., not merely a network port identity), while also being able to infer and track the endpoint location for security.

In one example deployment scenario, a third party authentication server (e.g., a Remote Authentication Dial-In Service (RADIUS) server) and an active directory server may be used to identify, authenticate, and authorize endpoints to access the network. These third party authentication systems may perform single-sign-on functionality, which have mechanisms for access control functionality directly at the application software level. However, the network in these deployment scenarios typically does not offer anything more than data transport value, except for scenarios in which the network security has been breached. Typically, this deployment scenario pertains to companies that have a manageable number of enterprise applications deployed to serve a large user/device environment, where the preference is to apply policy enforcement at the application software level.

In another example deployment scenario, a third party active directory server is used with an authentication server and network provided by another entity. The third party active directory servers are provisioned with proprietary solutions for group-object definitions of active directory members for the authorization functionality. The network elements are expected to perform (e.g., as part of a single sign-on) the three functions of identity, authentication, and network access control (e.g., policy enforcement). The network elements also jointly perform the authorization function by interfacing (e.g., with Security Association Markup Language (SAML) protocol) with the third party active directory server. The network elements and the third party server may exchange endpoint member group information and associated policies for each group. This deployment scenario typically pertains to companies that have a relatively high number of applications deployed to serve a large number of users/devices, and which would prefer to apply policy enforcement at the network edge or access point.

Referring now to FIG. 1, an onboarding system 100 is shown to flexibly provision endpoint 110 with network resources when it joins an enterprise network. The endpoint 110 joins the network fabric 120 through a network element 122, which is one of a plurality of network elements that provide the underlay for the network fabric 120. A network controller 130 organizes the network fabric 120 through a fabric control plane, e.g., by maintaining routing tables for any endpoint connected to the fabric.

When the endpoint 110 joins the network fabric 120, it contacts a DHCP server 140 and is assigned a network address, e.g., an IP address. The endpoint 110 uses the assigned IP address to communicate with an authentication server 150 to establish the identity profile of the endpoint 110. The authentication server 150 includes user group logic 160 configured to authenticate the credentials provided by the endpoint 110 and establish a user group identity for the endpoint 110. The authentication server 150 also includes Identity Services Engine (ISE) 170 configured to establish network access policy rules based on user group identities. In one example, the ISE 170 determines the proper VLAN for endpoint 110 based on the user identity associated with the endpoint 110 as authenticated by the user group logic 160.

The ISE 170 instructs the network controller 130 to route network traffic for the endpoint 110 through the proper VLAN, and the network controller 130 propagates that information to all of the network elements in the network fabric 120 (e.g., network element 122). In one example, the controller 130 propagates a routing table that associates the DHCP-assigned IP address of the endpoint 110 with the appropriate VLAN and with the fabric edge network element 122. After the network elements in the network fabric 120 have been updated by the network controller 130, any network traffic to/from the endpoint 110 is routed over the appropriate VLAN for the user identity authenticated by the authentication server 150.

In one example, the authentication server 150 may comprise multiple physical or virtual servers, which perform various functions ascribed to the authentication server. For instance, the user group logic 160 may be implemented on an Active Directory server, while the ISE 170 is implemented on a separate server. In this instance, the components of the authentication server 150 may exchange information with each other through user agents or other independent means of communication.

In one example, as the endpoint 110 connects to the network element 122, the network interface in the endpoint 110 starts the DHCP process with the DHCP server 140. The DHCP server 140 assigns an IP address (e.g., 10.1.1.1) in a VLAN (e.g., VLAN #100) to the endpoint 110. The endpoint 110 authenticates with the user group logic 160 in the authentication server 150 (e.g., with LDAP) and establishes an association between the user identity of the endpoint 110 (e.g., the userID) and the DHCP-assigned network address (e.g., IP address). The user group logic 160 may include an agent to communicate that association to the ISE 170.

Using the association between the user identity of the endpoint 110 and the IP address that was assigned, the ISE 170 determines that the VLAN needs to be changed. The ISE 170 issues a COA to the network controller 130 to put the endpoint 110 into a second VLAN (e.g., VLAN #200). However, since the second VLAN belongs to a separate Virtual Routing and Forwarder (VRF), the second VLAN works with the same subnet (e.g., 10.0.0.8) without changing the IP address of the endpoint 110. Since, the endpoint 110 is moved to the second VLAN without changing its IP address, the endpoint 110 can maintain communication with the external world and among any users/devices with which the endpoint 110 is supposed to communicate.

Figure 2:
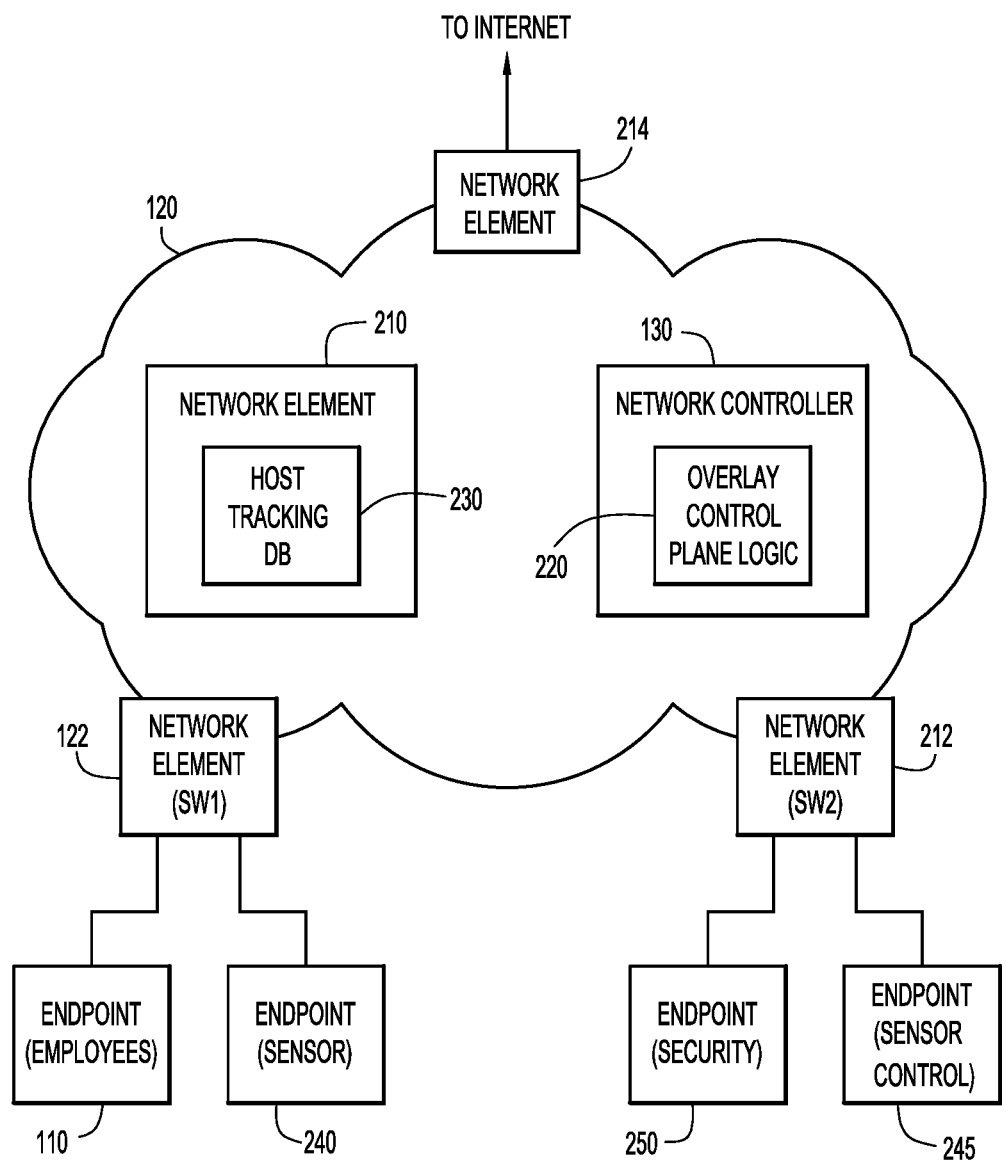
FIG. 2 is a simplified block diagram of the local network fabric and a plurality of endpoints that belong to different user groups on different virtual networks, according to an example embodiment.

Referring now to FIG. 2, a block diagram illustrates an example of the network fabric 120 providing access control to multiple endpoints based on the authenticated user group identity of each endpoint. In addition to the network element 122 and network controller 130 shown in FIG. 1, the network fabric 120 includes network elements 210, 212, and 214. Endpoint 214 is shown as the gateway to the Internet and any other external resources, such as the DHCP server 140 and the authentication server 150 shown in FIG. 1. The network controller 130 includes overlay control plane logic 220 that controls how network traffic traverses the network fabric 120. The network element 210 is used as an example of any of the network elements in the network fabric 120 and includes a Host Tracking Database 230.

Endpoint 110 is shown as an employee's computer (i.e., it has authenticated into an Employee user group) and is connected to the network fabric 120 at network element 122 (e.g., switch SW1). The Employee user group is serviced by a first VLAN, which may include specific network access restrictions set by a policy in the ISE 170 shown in FIG. 1. Endpoint 240 is also connected to the network fabric 120 at the network element 122, but belongs to a Sensor user group, which is serviced by a second VLAN. Endpoint 245 is connected to the network fabric 120 through network element 212 (e.g., switch SW2), and belongs to a Sensor Control user group, which is serviced by the second VLAN. In other words, endpoint 240 and endpoint 245 are both serviced by the same VLAN resources despite being in separate user groups and connected to the network fabric 120 at different network elements.

Additionally, endpoint 250 is shown as a security device (i.e., it has been authenticated into a Security user group), which may include devices used in a security context (e.g., computers used by security personnel, entry badge scanners, etc.). Endpoint 250 is connected to the network fabric through network element 212, but is serviced by a third VLAN. In one example, the third VLAN (i.e., the VLAN associated with security operations) may be separate since the security is operated by a different tenant (e.g., a subcontractor) in the network fabric 120. Alternatively, the third VLAN may be separate due to policy decisions within the same tenant.

In one example, when the endpoint 110 authenticates its user group identity, the endpoint 110 changes {Layer-2, Layer-3} context to conform to the context appropriate for its authenticated user group identity. However, the endpoint 110 keeps its original IP address and subnet by changing its {Bridge Domain (BD), VRF} combination. Through the overlay control plane logic 220, the network controller 130 updates the Host Tracking Database 230 on each of the network elements in the network fabric 120. The updated Host Tracking Database 230 associates the IP address of endpoint 110 with a new {BD,VRF}.

In other words, after authentication, the subnet/IP address is preserved, but the endpoint 110 is put in a new BD/VRF by updating the control plane with the new information. This also leads to the deletion of the old association between the endpoint 110 and the original BD/VRF. This change may be driven by an association between a SGT and the new BD/VRF or by host identification (e.g., by device profiling). In essence, three changes are propagated through the network fabric 120:

1) Update on each network element (e.g., switch, router, etc.) to the new BD/VRF based on the group identification of the endpoint 110.
2) Update of the control plane, so that traffic to/from the endpoint 110 can flow.
3) Purge each network element (e.g., switch, router, etc.) of the old routing information that is no longer valid.

Figure 3:
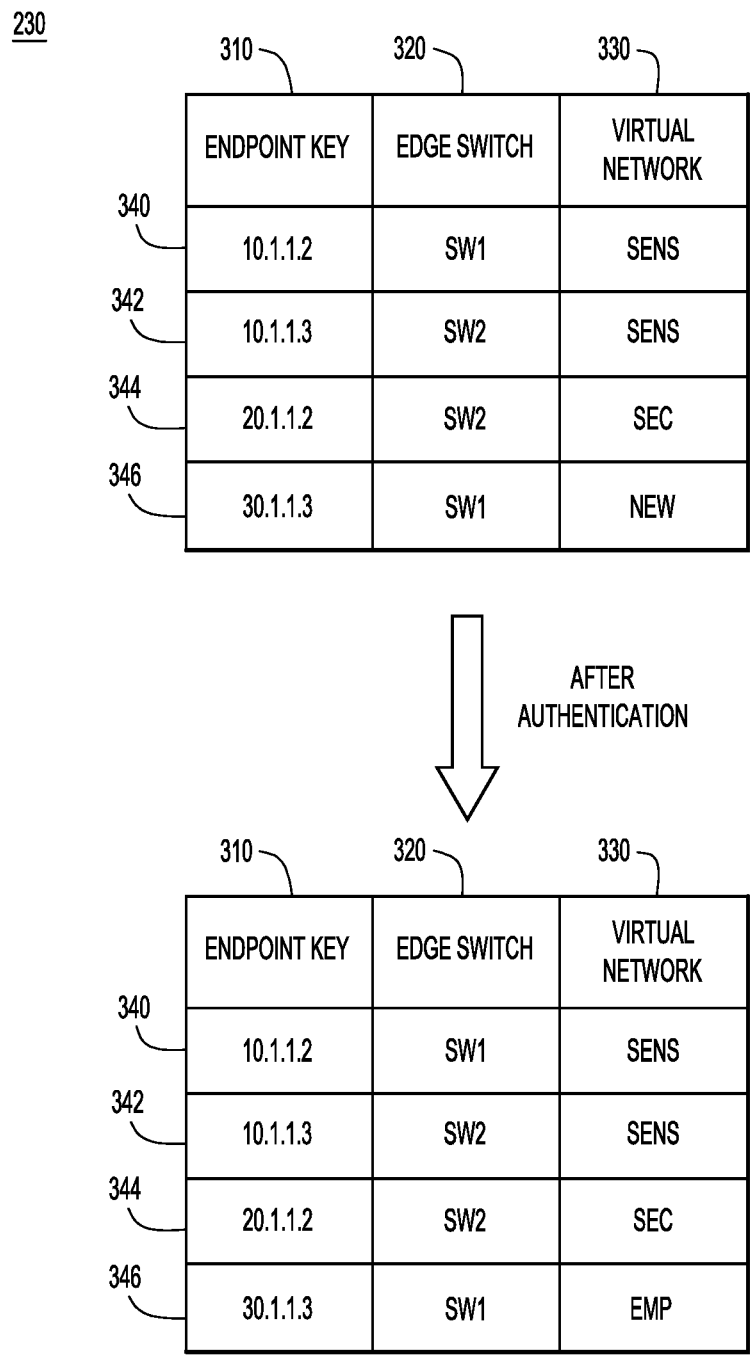
FIG. 3 illustrates a host tracking database for the overlay control plane of the local network fabric, according to an example embodiment.

Referring now to FIG. 3, an example of updating the Host Tracking Database 230 when a new endpoint joins is shown. The Host Tracking Database 230 includes rows for each endpoint attached to the network fabric 120. Each row includes an entry in column 310 that uniquely corresponds to an endpoint. The Endpoint Key column 310 may include a MAC address, an IP address, or an OUI associated with a particular endpoint. The Edge Switch column 320 corresponds to the network element through which the endpoint is connected to the network fabric 120. In other words, the Edge Switch entry corresponds to the location of the endpoint with respect to a network element (e.g., switch or router). The Virtual Network column 330 corresponds to the Layer-2 or Layer-3 context of the endpoint. In other words, the Virtual Network entry includes the VLAN/BD/VRF on which network traffic for the endpoint will be routed.

Rows 340, 342, 344, and 346 in Host Tracking Database 230 are now described with reference to the endpoints shown in FIG. 2. In particular, row 340 corresponds to endpoint 240, which has been assigned a unique identifier 10.1.1.2 (i.e., the DHCP-assigned IP address). The endpoint 240 is connected to the network fabric 120 through network element 122 (i.e., switch SW1), and will be provisioned by the second VLAN (i.e., VLAN SENS, the "Sensor" VLAN). Similarly, row 342 corresponds to endpoint 245 showing that endpoint 245 is identified by its IP address 10.1.1.3. The endpoint 245 is connected through network element 212 (i.e., switch SW2), and will be provisioned by the second VLAN (i.e., VLAN SENS).

Row 344 corresponds to endpoint 250 and shows that endpoint 250 is identified by its IP address 20.1.1.2. The endpoint 250 is connected to the network fabric 120 through network element 212 (i.e., switch SW2) and will be provisioned by the third VLAN (i.e., VLAN SEC, the "Security" VLAN). Row 346 corresponds to newly joined endpoint 110 after it has connected to the network fabric 120 and obtained an IP address from the DHCP process. Endpoint 110 is identified by its IP address 30.1.1.3 and is initially provisioned by a temporary VLAN (i.e., VLAN NEW). Row 346 also shows that the endpoint 110 is connected to the network fabric 120 through network element 122 (i.e., switch SW1).

After the endpoint 110 has been authenticated as a member of the "Employee" user group, the Host Tracking Database 230 is updated to reflect the proper VLAN resources for an employee's computer. In this instance, the Virtual Network column 330 entry of the row 346 is changed to show that network traffic for the endpoint 110 will now be handled on a third VLAN (i.e., VLAN EMP, the "Employee" VLAN). As shown in FIG. 3, the entries in column 330 specifying the virtual network may be BD values, VRF values, or other VLAN designators.

In one example, the temporary VLAN (i.e., VLAN NEW) is used as a preliminary VLAN when any endpoint initially connects to the network fabric, before authentication. Any endpoints on the temporary VLAN may only be allowed access to communicate with certain common services (e.g., DHCP, authentication, etc.) and may not be allowed to communicate with other endpoints on the temporary VLAN. Once an endpoint has been authenticated and moved to a VLAN appropriate for its user identity, then the endpoint can access any network resources as deemed appropriate for the authenticated user identity.

Figure 4:
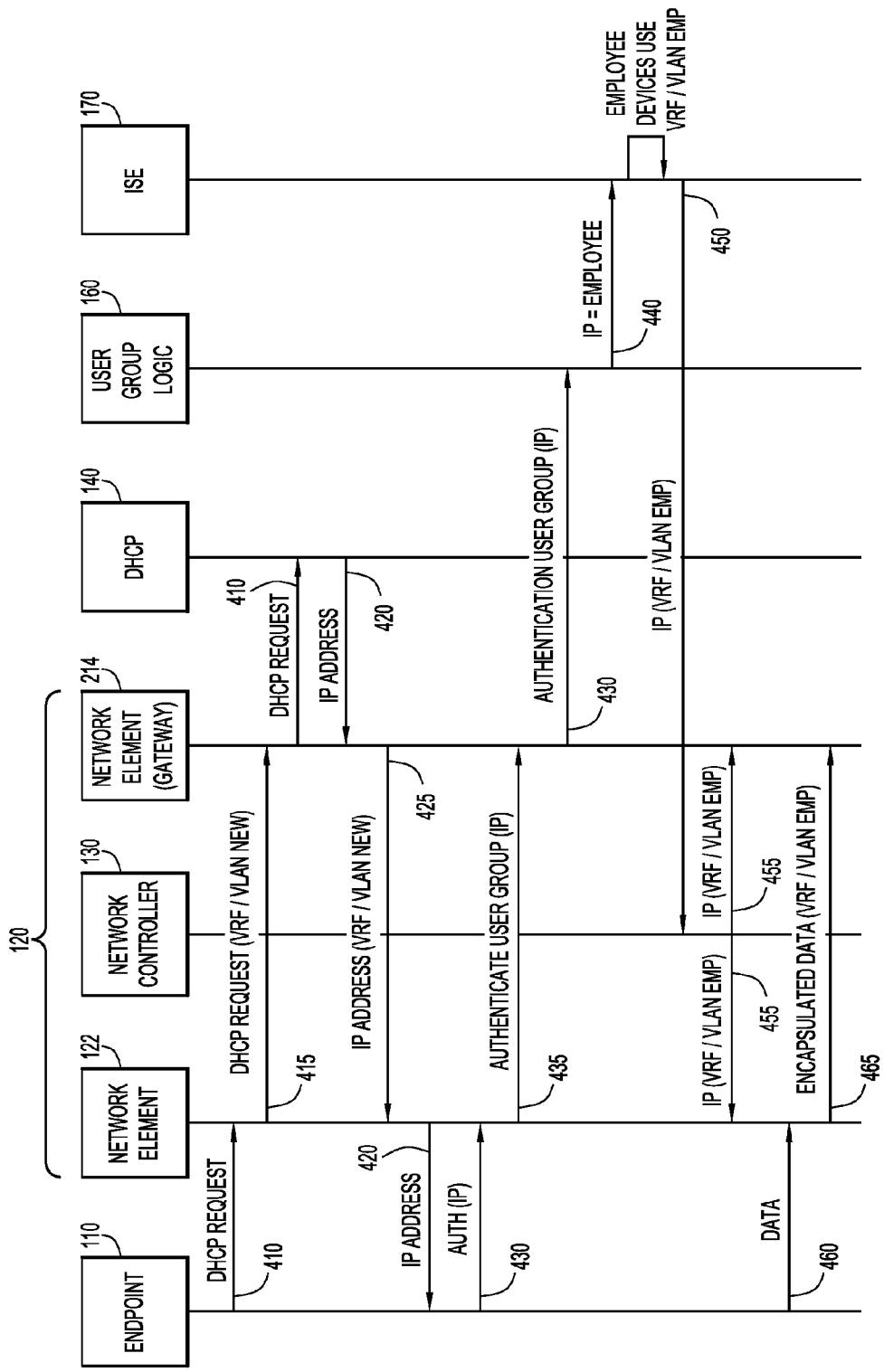
FIG. 4 is a sequence diagram showing messages passed in provisioning an endpoint with appropriate virtual network resources, according to an example embodiment.

Referring now to FIG. 4, a ladder diagram illustrates an example of an endpoint joining the network fabric 120. Upon initially connecting to the network fabric 120 via network element 122, the endpoint 110 sends a DHCP request 410. The network element 122 encapsulates the DHCP request 410 as an encapsulated DHCP request 415 and forwards the DHCP request 415 to the gateway network element 214. Since the endpoint 110 is newly joining the network fabric 120, the DHCP request is routed along a temporary VLAN (i.e., VRF/VLAN NEW). The gateway network element 214 removes the encapsulation and forwards the DHCP request 410 to the DHCP server 140. The DHCP server 140 assigns an IP address to the endpoint 110 and returns the IP address in DHCP response 420 to the gateway network element 214. The gateway network element 214 encapsulates the DHCP response 420 as encapsulated DHCP response 425 and forwards it to the network element 122 where the endpoint 110 is connected to the network fabric 120. The network element 122 removes the encapsulation and forwards the DHCP response with the assigned IP address to the endpoint 110.

With the DHCP-assigned IP address, the endpoint 110 sends an authentication message 430 toward the user group logic 160 (e.g., an Active Directory server) through the network fabric 120. The edge network element 122 encapsulates the authorization message 430 as encapsulated authentication message 435 and forwards the message 435 to the gateway network element 214. The gateway network element 214 removes the encapsulation and forwards the authentication message 430 to the user group logic 160. The user group logic 160 authenticates that the endpoint 110 belongs to the "Employee" user group, and sends a message 440 to the ISE 170 that the IP address assigned to the endpoint 110 is associated with a device in the "Employee" user group.

The ISE 170 determines that devices that have been authenticated into the "Employee" user group will be provisioned with the VLAN EMP. The ISE 170 sends a message 450 to the network controller 130 associating the IP address of the endpoint 110 with the VLAN EMP. The network controller 130 updates the control plane and sends an update message 455 to all of the network elements in the network fabric 120. The update message 455 causes each network element to update their respective Host Tracking Database with an entry that associates the endpoint 110 with the appropriate VLAN (i.e., VRF/VLAN EMP) for an authenticated "Employee" user group device.

After all of the network elements have updated their respective Host Tracking Databases, the endpoint 110 may have a data packet 460 to send to another device that is not connected to the network fabric 120. The edge network element 122 encapsulates the data packet 460 for transport across the network fabric 120 as encapsulated packet 465, and forwards the packet to the gateway network element 214. The gateway network element 214 removes the encapsulation and forwards the data packet 460 toward its external destination. By changing the VLAN context of the endpoint 110 in the Host Tracking Database of each network element in the network fabric 120, the endpoint 110 can keep its DHCP-assigned IP address even though the virtual networking resources have been changed to reflect the authenticated user group identity of the endpoint 110.

In one example, the endpoint device maintains many of the settings assigned by the DHCP server after the authentication server places the endpoint in a new VLAN, because both the Layer-2 and Layer-3 contexts are changed in response to the authentication change. In other words, the endpoint changes from a first VLAN to a second VLAN and changes from a first VRF to a second VRF, but maintains the same subnet, the same gateway IP address, and the same MAC address. In essence, due to the VRF change, the endpoint can keep the same network address parameters. Since the VRF changed, the new VLAN can have the same parameters for the Switch Virtual Interface (SVI). Table 1 below illustrates the endpoint settings before and after authentication.

TABLE 1

Endpoint Network Settings

| | Before Authentication | After Authentication |
| --- | --- | --- |
| Endpoint IP address | 10.1.1.20/24 | 10.1.1.20/24 |
| Endpoint MAC | AA | AA |
| Gateway IP address | 10.1.1.254/24 | 10.1.1.254/24 |
| Gateway MAC | BB | BB |
| VLAN | NEW | EMP |
| VRF | RED | GREEN |

Figure 5:
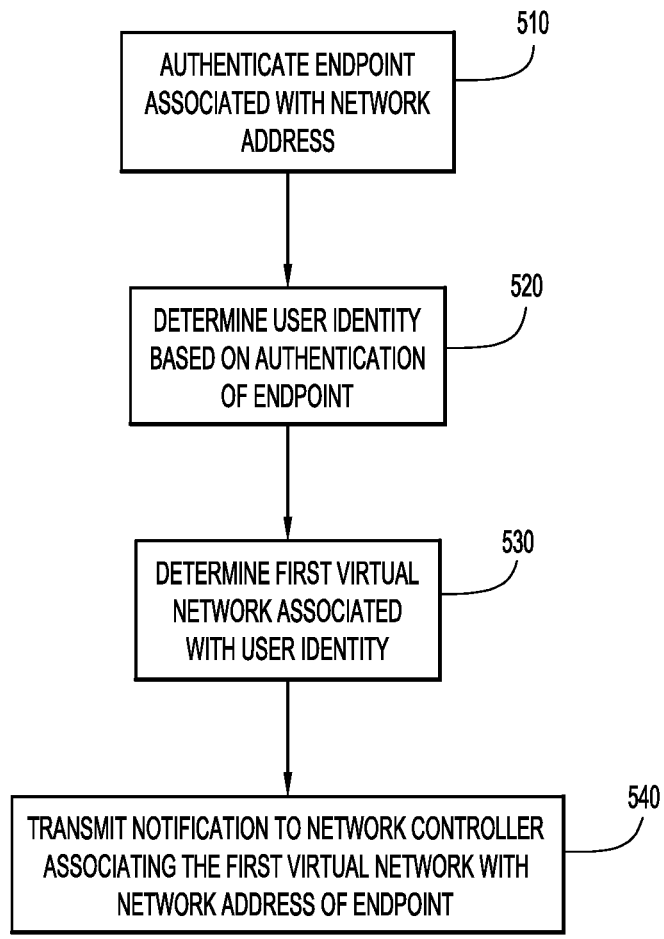
FIG. 5 is a flowchart illustrating operations of an authentication server in provisioning an endpoint according to its user identity, according to an example embodiment.

Referring now to FIG. 5, a flowchart illustrates operations performed by the authentication server 150 in a process 500 to adjust the virtual network context of an endpoint based on the authentication of the user identity of the endpoint. In step 510, the authentication server 150 authenticates an endpoint that is associated with a network address. In one example, the network address is an IP address assigned through a DHCP procedure. In step 520, the authentication server 150 determines a user identity of the endpoint based on the authentication of the endpoint. In one example, the user identity may be a user group identity that may include multiple devices.

Based on the determined user identity of the endpoint, the authentication server 150 determines a first virtual network at step 530. According to a predetermined policy, network traffic for endpoints of the determined user identity will use the first virtual network resources. In step 540, the authentication server 150 transmits a notification to a network controller of an underlay network to which the endpoint is attached. The notification transmitted in step 540 associates the first virtual network with the network address of the endpoint.

Figure 6:
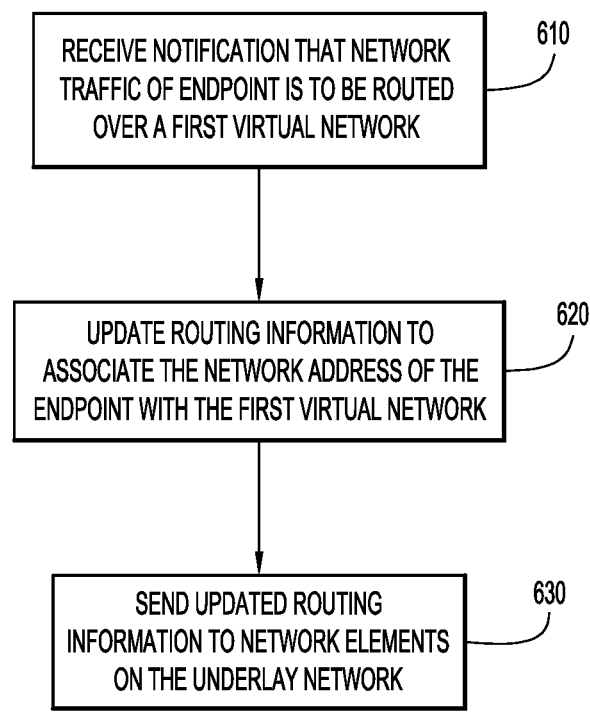
FIG. 6 is a flowchart illustrating operations of a network fabric controller in updating the fabric underlay based on the user identity of an endpoint, according to an example embodiment.

Referring now to FIG. 6, a flowchart illustrates operations performed by a network controller 130 of an underlay network in a process 600 to change the virtual network resources of an endpoint based on the authenticated user identity of the endpoint. In step 610, the controller 130 receives a notification that network traffic for an endpoint associated with a particular network address is to be routed over a first virtual network on the underlay network. In one example, the endpoint is connected through the underlay network to a server (e.g., an authentication server 150) that provided the notification.

In step 620, the controller 130 updates routing information for the underlay network to associate the network address of the endpoint with the first virtual network. In one example, updating the routing information comprises updating the control plane logic for the underlay network. In step 630, the controller 130 sends the updated routing information to the plurality of network elements that compose the underlay network. In one example, the updated routing information may be an update to a Host Tracking Database. Each network element in the underlay network will update its respective Host Tracking Database entry for the IP address associated with the endpoint to ensure that network traffic for the endpoint is routed over the first virtual network.

Figure 7:
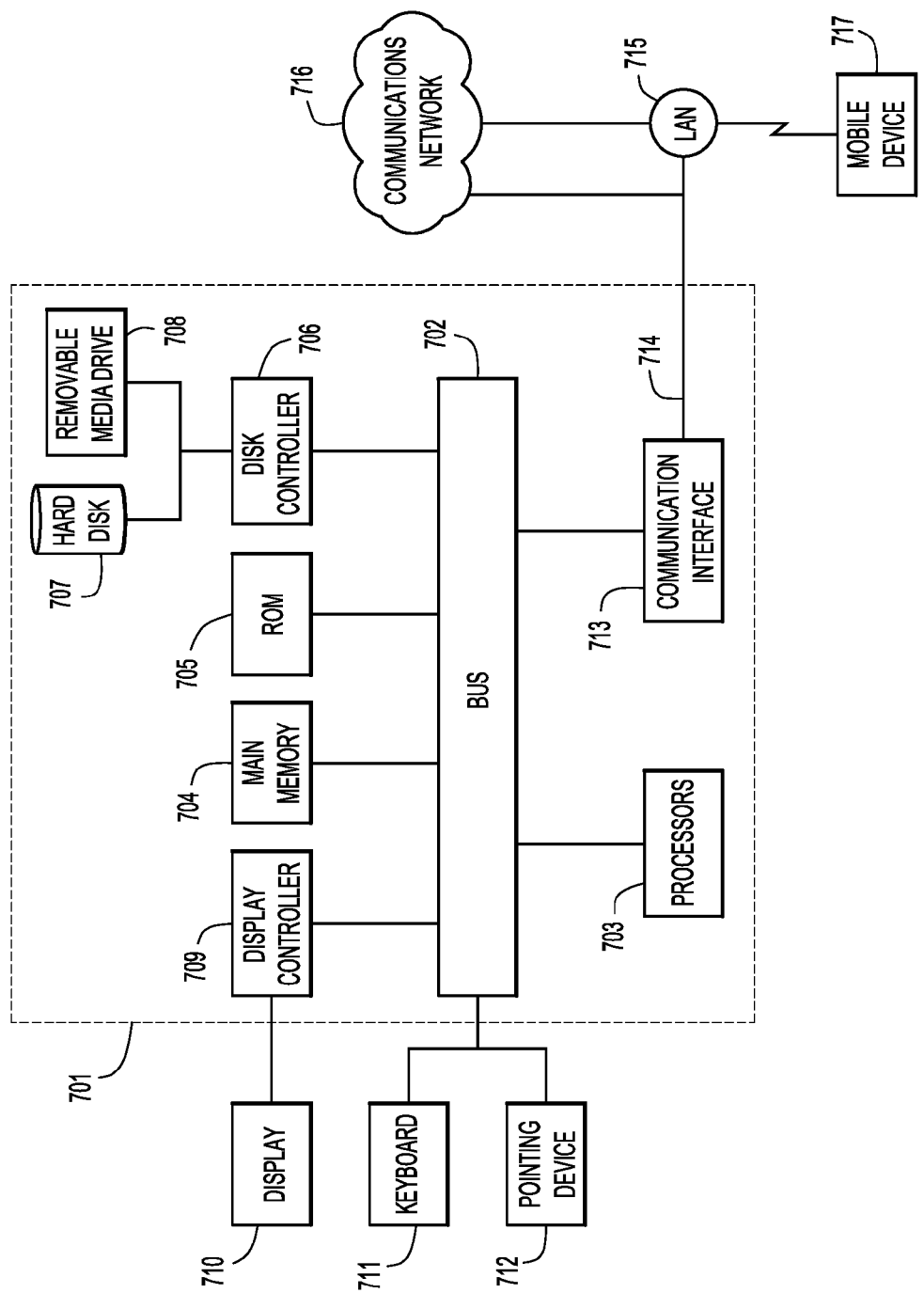
FIG. 7 illustrates a simplified block diagram of a device that may be configured to perform methods presented herein, according to an example embodiment.

Referring now to FIG. 7, an example of a computer system 701 (e.g., network element 210, network controller 130, authentication server 150, etc.) upon which the embodiments presented may be implemented is shown. The computer system 701 may be programmed to implement a computer based device, such as a sensor endpoint, a network element, or a server running one or more virtual machines. The computer system 701 includes a bus 702 or other communication mechanism for communicating information, and a processor 703 coupled with the bus 702 for processing the information. While the figure shows a single block 703 for a processor, it should be understood that the processors 703 may represent a plurality of processing cores, each of which can perform separate processing. The computer system 701 also includes a main memory 704, such as a random access memory (RAM) or other dynamic storage device (e.g., dynamic RAM (DRAM), static RAM (SRAM), and synchronous DRAM (SD RAM)), coupled to the bus 702 for storing information and instructions to be executed by processor 703. In addition, the main memory 704 may be used for storing temporary variables or other intermediate information during the execution of instructions by the processor 703.

The computer system 701 further includes a read only memory (ROM) 705 or other static storage device (e.g., programmable ROM (PROM), erasable PROM (EPROM), and electrically erasable PROM (EEPROM)) coupled to the bus 702 for storing static information and instructions for the processor 703.

The computer system 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive, solid state drive, etc.). The storage devices may be added to the computer system 701 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 701 may also include a display controller 709 coupled to the bus 702 to control a display 710, such as a cathode ray tube (CRT), liquid crystal display (LCD) or light emitting diode (LED) display, for displaying information to a computer user. The computer system 701 includes input devices, such as a keyboard 711 and a pointing device 712, for interacting with a computer user and providing information to the processor 703. The pointing device 712, for example, may be a mouse, a trackball, track pad, touch screen, or a pointing stick for communicating direction information and command selections to the processor 703 and for controlling cursor movement on the display 710. In addition, a printer may provide printed listings of data stored and/or generated by the computer system 701.

The computer system 701 performs a portion or all of the processing steps of the operations presented herein in response to the processor 703 executing one or more sequences of one or more instructions contained in a memory, such as the main memory 704. Such instructions may be read into the main memory 704 from another computer readable medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the computer system 701 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 701, for driving a device or devices for implementing the operations presented herein, and for enabling the computer system 701 to interact with a human user (e.g., wireless network administration personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716 such as the Internet. For example, the communication interface 713 may be a wired or wireless network interface card to attach to any packet switched (wired or wireless) LAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local are network 715 (e.g., a LAN) or through equipment operated by a service provider, which provides communication services through a communications network 716. The local network 714 and the communications network 716 use, for example, electrical, electromagnetic, or optical signals that carry digital data streams, and the associated physical layer (e.g., CAT 5 cable, coaxial cable, optical fiber, etc.). The signals through the various networks and the signals on the network link 714 and through the communication interface 713, which carry the digital data to and from the computer system 701 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 701 can transmit and receive data, including program code, through the network(s) 715 and 716, the network link 714 and the communication interface 713. Moreover, the network link 714 may provide a connection through a LAN 715 to a mobile device 717 such as a personal digital assistant (PDA), laptop computer, or cellular telephone.

In summary, the techniques presented herein provide for a method to support IP transparency for endpoint devices connecting to a network fabric. This eliminates the need to change the endpoint's IP address when a Change of Authorization alters the virtual network resources assigned to the endpoint in response to the endpoint authenticating into a user group.

In one form, a system is provided to change the virtual network for an endpoint based on the authenticated user identity of the endpoint. The system comprises a server and a controller associated with a network fabric to which the endpoint is connected. The network fabric includes a plurality of network elements configured to carry network traffic for the endpoint. The server is configured to authenticate the endpoint associated with a network address and determines a user identity of the endpoint based on the authentication. The server is also configured to determine a first virtual network associated with the user identity. The controller is configured to receive a notification from the server that the network traffic for the endpoint associated with the network address is to be routed over the first virtual network. The controller is also configured to update routing information to associate the network address with the first virtual network and send the updated routing information to the plurality of network elements.

In another form, a method is provided for a server to authenticate an endpoint and notify a network fabric of which virtual network the endpoint will use. The method comprises, at the server, authenticating an endpoint associated with a network address. The endpoint is connected to the server through a network fabric. The server determines a user identity of the endpoint based on the authentication of the endpoint and determines a first virtual network associated with the determined user identity. A notification is transmitted to a controller of the network fabric associating the first virtual network with the network address of the endpoint.

In yet another form, a method is provided for a controller of a network fabric that comprises a plurality of network elements to change the virtual network resources allocated to an endpoint. The method comprises, at the controller of the network fabric, receiving a notification that network traffic for an endpoint associated with a network address is to be routed over a first virtual network on the network fabric. The endpoint is connected to a server through the network fabric. The controller updates routing information to associate the network address with the first virtual network and send the updated routing information to the plurality of network elements.

In a further form, an apparatus comprising a network interface and a processor is configured to perform any of the methods described and shown herein.

In still another form, a non-transitory computer readable storage media is provided that is encoded with instructions that, when executed by a processor, cause the processor to perform any of the methods described and shown herein.

The above description is intended by way of example only. In particular, the techniques described herein have been described with respect to onboarding user endpoints to a network fabric, but may also be used independent of any particular network fabric.

What is claimed is:

1. A system comprising:
   a server comprising one or more hardware processors configured to:
      authenticate an endpoint associated with a network address on an initial virtual network;
      determine a user identity of the endpoint based on authentication of the endpoint; and
      determine an authorized virtual network associated with the user identity; and
      generate a Change-Of-Authorization (COA) message moving the endpoint to the authorized virtual network; and
   a controller device associated with a network fabric to which the endpoint is connected, the network fabric including a plurality of network elements configured to carry network traffic for the endpoint, wherein the controller is configured to:
      receive the COA message from the server that the network traffic for the endpoint associated with the network address is to be routed over the authorized virtual network;
      based on the COA message received from the server, store an association of the network address with the authorized virtual network;

based on the association of the network address with the authorized virtual network, update routing information to associate the network address with the authorized virtual network instead of the initial virtual network; and send the updated routing information to the plurality of network elements, without changing the network address of the endpoint.

2. The system of claim 1, wherein the controller is configured to update the routing information by associating the network address of the endpoint with a layer 2 identifier of the authorized virtual network or a layer 3 identifier of the authorized virtual network.

3. The system of claim 1, wherein the plurality of network elements are further configured to receive a packet for the endpoint, encapsulate the packet in accordance with an overlay protocol, and route the packet along the authorized virtual network according to the updated routing information.

4. The system of claim 1, wherein the server is further configured to:
receive an indication of the user identity from the endpoint;
confirm the user identity of the endpoint; and
associate user identities with one or more virtual networks through an identity service function.

5. The system of claim 4, wherein the server is configured to associate user identities with one or more virtual networks through Source Group Tags based on an identity policy.

6. The system of claim 1, further comprising a Dynamic Host Configuration Protocol server to provision the endpoint with the network address on the initial virtual network.

7. The system of claim 1, wherein the network address is one of Media Access Control address, an Internet Protocol address, or an Organizational Unique Identifier.

8. A method comprising:
at a server comprising one or more hardware processors, authenticating an endpoint associated with a network address on an initial virtual network, the endpoint connected to the server through a network fabric;
determining a user identity of the endpoint based on the authentication of the endpoint;
determining an authorized virtual network associated with the determined user identity;
generating a Change-Of-Authorization (COA) message moving the endpoint to the authorized virtual network; and
transmitting the COA message to a controller of the network fabric, the COA message including an association of the network address of the endpoint with the authorized virtual network instead of the initial virtual network.

9. The method of claim 8, wherein the COA message associates the network address of the endpoint with a layer 2 identifier of the authorized virtual network or a layer 3 identifier of the authorized virtual network.

10. The method of claim 8, wherein determining the authorized virtual network is with an identity service function that is configured to associate user identities with virtual networks.

11. The method of claim 10, wherein the identity service function associates user identities with virtual networks through Source Group Tags based on an identity policy.

12. The method of claim 8, wherein the network address is one of Media Access Control address, an Internet Protocol address, or an Organizational Unique Identifier.

13. A method comprising:
at a controller device associated with a network fabric that comprises a plurality of network elements, receiving a Change-Of-Authorization (COA) message indicating that network traffic for an endpoint associated with a network address on an initial virtual network is to be routed over an authorized virtual network on the network fabric, the endpoint connected to a server through the network fabric;
based on the COA message received from the server, storing an association of the network address with the authorized virtual network;
based on the association of the network address with the authorized virtual network, updating routing information to associate the network address with the authorized virtual network instead of the initial virtual network; and
sending the updated routing information to the plurality of network elements without changing the network address of the endpoint.

14. The method of claim 13, wherein updating the routing information comprises associating the network address of the endpoint with a layer 2 identifier of the authorized virtual network or a layer 3 identifier of the authorized virtual network.

15. The method of claim 13, wherein the COA message is received from an identity service function of the server, the identity service function configured to associate user identities with virtual networks.

16. The method of claim 15, wherein the COA message from the identity service function includes a Source Group Tag based on an identity policy to associate the authorized virtual network with a user identity of the endpoint.

17. The method of claim 13, wherein the network address is one of Media Access Control address, an Internet Protocol address, or an Organizational Unique Identifier.

18. The system of claim 1, wherein the authorized virtual network is associated with a separate Virtual Routing and Forwarder (VRF) than that of the initial virtual network.

19. The method of claim 8, wherein the authorized virtual network is associated with a separate Virtual Routing and Forwarder (VRF) than that of the initial virtual network.

20. The system of claim 13, wherein the authorized virtual network is associated with a separate Virtual Routing and Forwarder (VRF) than that of the initial virtual network.

* * * * *